United States Patent [19]

Newell, III et al.

[11] 4,241,871
[45] Dec. 30, 1980

[54] APPARATUS AND METHOD FOR VENTILATION OF ANIMAL ENCLOSURES

[76] Inventors: Alfred T. Newell, III, 324 Redwood St., Birmingham, Ala. 35210; Alfred T. Newell, Jr., 3809-12 Court St., Birmingham, Ala. 35222

[21] Appl. No.: 964,053

[22] Filed: Nov. 27, 1978

[51] Int. Cl.³ .................... B64D 13/00; F24F 7/00
[52] U.S. Cl. ............................ 236/49; 98/1.5; 98/33 R; 236/1 E
[58] Field of Search .............. 236/49, 78 A, 1 ER; 98/1.5, 33 R, 41 R; 165/16; 364/108

[56] References Cited

U.S. PATENT DOCUMENTS

| 3,601,030 | 8/1971 | Bryant | 98/37 X |
| 3,611,906 | 10/1971 | Lorenz | 98/33 R |

Primary Examiner—William E. Wayner
Attorney, Agent, or Firm—David H. Hill

[57] ABSTRACT

An automatic ventilation system for an enclosure for animals, fowl and the like, whereby plural banks of exhaust fans are controlled by respective thermostats set for operation at respective individual temperatures over an operating range of temperatures, while movable baffles or the like at air inlet apertures are adjusted under the control of a differential-pressure sensing means to regulate the rate of flow of air through the inlet apertures to maintain a desired difference between the barometric pressure within and without the enclosure irrespective of the number of banks of fans in operation at a given time; when the thermostat set at the highest temperature is actuated, the movable baffles are adjusted for maximum flow irrespective of the output of the differential-pressure sensing means, thereby establishing a second, and smaller, differential pressure; upon failure of the primary power source, a second power source is automatically utilized to adjust the inlet baffles to a position of maximum opening, with automatic return to normal operation upon revival of the primary power source.

18 Claims, 3 Drawing Figures

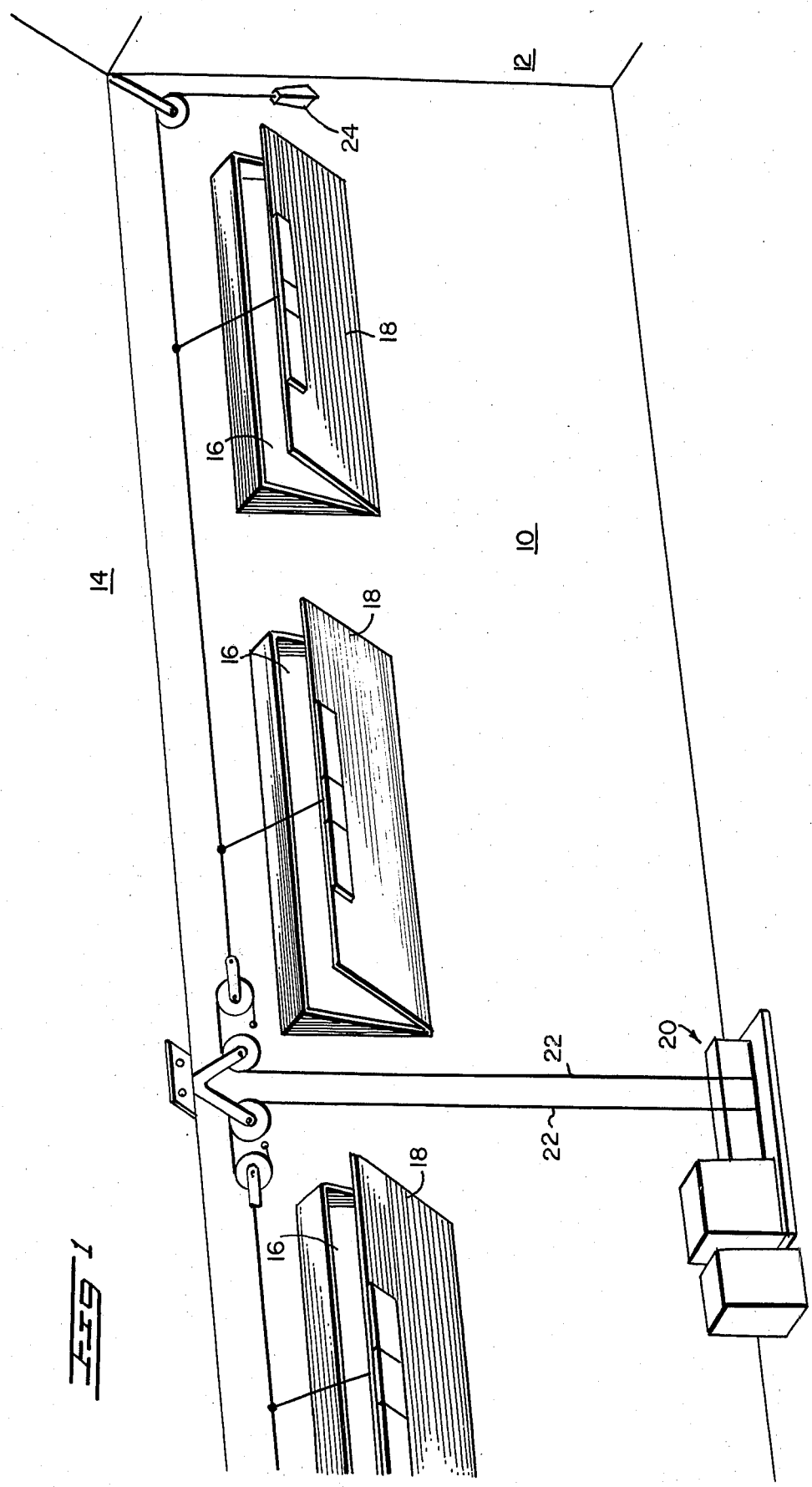

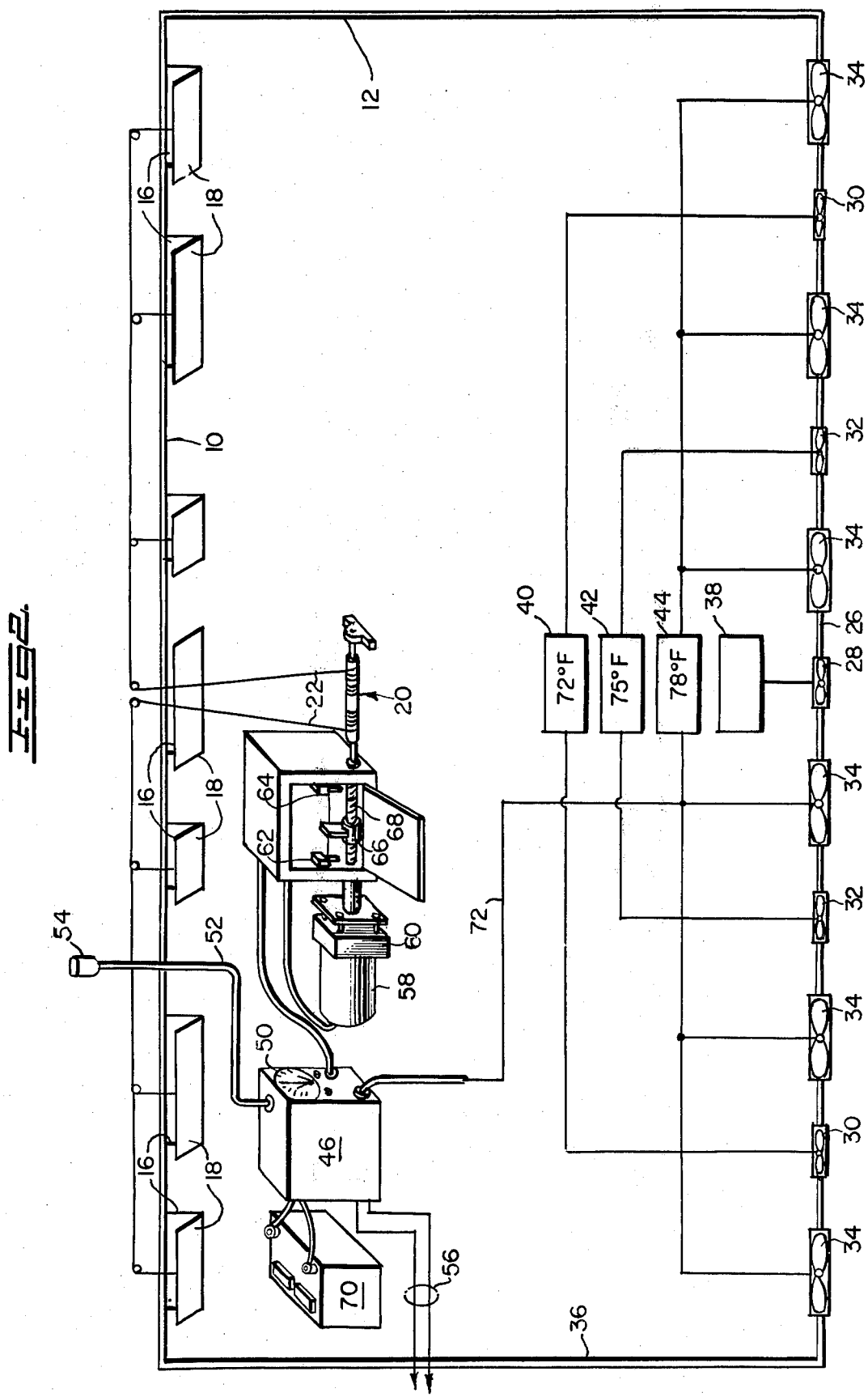

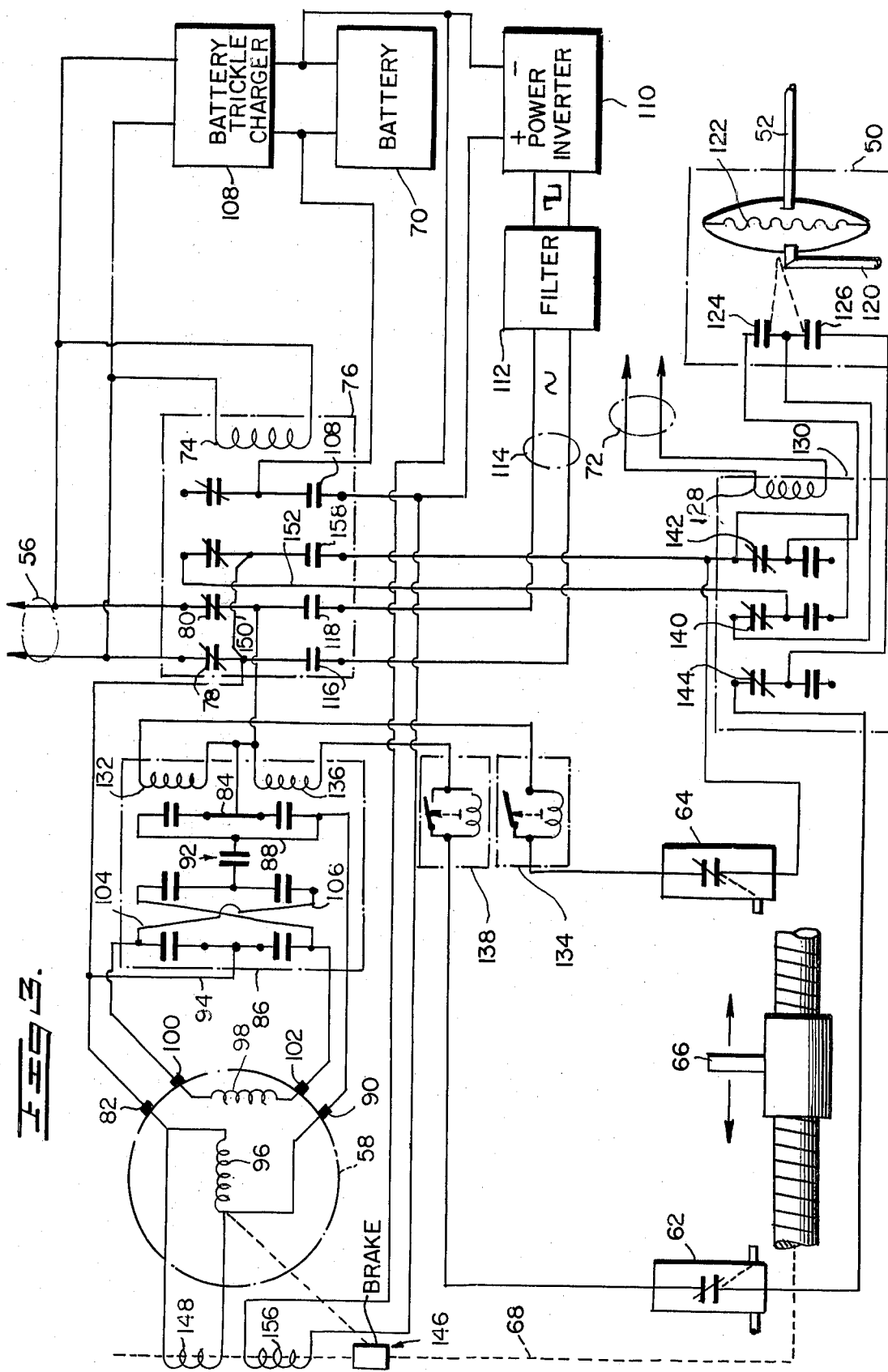

APPARATUS AND METHOD FOR VENTILATION OF ANIMAL ENCLOSURES

FIELD OF THE INVENTION

This invention pertains generally to the ventilation of enclosures for animals or the like, and more particularly to automatic ventilation of such enclosures wherein satisfactory flow of ventilating air is assured by maintaining a desired difference between the barometric pressure within the enclosure and that outside the enclosure.

DESCRIPTION OF THE PRIOR ART

Controlled-environment animal enclosures of various types abound in the prior art. One of the early types, which is still in widespread use, is the manual curtain house, the open sides of which are covered by curtains which are lowered and raised by hand to permit circulation of air through the enclosure to a desired degree. An obvious disadvantage of this type of enclosure is that an attendant must be in the vicinity to move the curtains, as needed. Further, in the manual curtain house the control of the internal environment is far from precise, depending to a large degree upon the attentiveness of the person in charge with respect to changes in temperature, wind velocity, etc.

An improvement over the manual curtain house is the automatic curtain house, in which the curtains are raised or lowered under the control of thermostats or other means for sensing various parameters of the environment within the house. Enclosures of this type are exemplified by U.S. Pat. No. 3,042,001, to Orville Dubie.

A third type of controlled-environment animal enclosure is the forced-ventilation type, in which large electric fans force a flow of ventilating air into, through and out of the enclosure, usually under the control of a thermostat.

In order to improve the pattern of flow of ventilating air, so as to achieve more uniform cooling and ventilation, some forced-ventilation enclosures are arranged to create a difference between the rates of flow of ventilating air into and out of the enclosure, resulting in a difference between the barometric pressure within the enclosure and that outside the enclosure. In the more common usage, the air is exhausted from the animal house at a greater rate than that at which it is permitted to enter the house, resulting in a lower pressure inside the house than that on the outside thereof, amounting to a partial vacuum within the house, relative to atmospheric pressure outside the house. It has been found that a pressure differential of approximately 0.10 inches (water column) is, generally speaking, desirable, and the prior art is replete with examples of houses of this type in which means are provided for comparing the internal pressure with the external pressure and for varying the rate of ingress or egress to maintain such a desired pressure differential, such as in U.S. Pat. Nos. 3,601,030; 3,831,046; 3,938,428 and 4,043,256.

As a refinement on the foregoing differential-pressure systems, the exhaust fan may be controlled by a thermostat and the size of the air inlet is then adjusted under the control of the pressure-comparing means to maintain the desired differential in pressure; see, for example, U.S. Pat. Nos. 3,611,906 and 3,951,336.

It has been discovered, however, that under conditions of high temperature and high rate of flow of ventilating air, it is desirable to substantially reduce the pressure differential to approximately 0.05 inches (water column). Further, the forced ventilation enclosure should be "fail-safe" with respect to a failure of the electrical power therefor, not merely activating an alarm to alert an attendant, but automatically conditioning the air inlets for maximum air flow to provide as much ventilation as possible, and equally importantly, automatically returning to normal operating conditions when the electrical power is again available, all without the assistance of an attendant. These features are not found in the prior art.

SUMMARY OF THE INVENTION

In accordance with the present invention, the foregoing and other improvements over the prior art are achieved by a ventilation control system which includes means for exhausting air from the enclosure at respectively different rates of flow for each of a plurality of predetermined temperatures, the rate of exhaust flow being greater for each successively high temperature, means for admitting air into the enclosure at a rate of flow selectable over a range from a minimum to a maximum flow, means for controlling the admitting means to maintain a first predetermined difference between the barometric pressure within the enclosure and that outside the enclosure, and means for disabling the controlling means at the highest of the predetermined temperatures and for setting said admitting means for maximum flow, thereby establishing a second predetermined difference between the barometric pressure within the enclosure and that outside the enclosure.

That is to say, the admitting means is automatically set for maximum air flow when the highest temperature is reached, the admitting means at such time not being under the control means for sensing the differential pressure; as a result, a second pressure difference is established, viz., that difference predetermined by both the maximum admitting opening and the maximum exhaust rate, a differential (like the first differential) which is independent of the environmental barometric pressure surrounding the enclosure. The aforementioned means for admitting air into the enclosure at a selectable rate of flow includes electromechanical drive means the operation of which varies such rate of flow, the electrical power for operating such elecromechanical drive means normally being supplied by a remote alternating current source; in accordance with the invention, means are connected to the remote source for converting the alternating current therefrom to direct current for charging a local direct current source, an inverter means is provided for inverting the output of the local direct current source to provide an alternating current output substantially similar to that of the remote alternating current source, and, further, safety means are provided responsive to the presence of alternating current from the remote source to connect such source to the electromechanical drive means, such safety means also being responsive to the absence of alternating current from the remote source to connect the local direct current source to the input of the inverter means and to connect the output of the inverter means to the electromechanical drive means to condition the admitting means for maximum air flow, the aforesaid safety means further being responsive to the renewed presence of alternating current from the remote source to disconnect the current inverter means from both the electromechanical drive means and the local direct current source and to connect the remote alternating current source, once again, to the electromechanical drive means.

BRIEF DESCRIPTION OF THE DRAWINGS

FIG. 1 is a perspective view of a portion of an enclosure utilizing the apparatus of the present invention, FIG. 2 is a schematic diagram representing a plan view of the animal enclosure of FIG. 1, with the major components of the apparatus of the present invention being illustrated in perspective, and FIG. 3 is an electrical circuit diagram of the apparatus of the present invention.

DESCRIPTION OF A PREFERRED EMBODIMENT

Referring now particularly to FIG. 1, there is shown a portion of the inside of an animal enclosure which may well be a house for the growing of chickens or the like. The side wall 10 may, for example, be some 250 to 500 feet in length, whereas the end wall 12 is usually 30 to 40 feet. A roof 14 and the remaining walls and floor complete the enclosure, such enclosure being substantially closed or sealed with respect to the outside environment except for a plurality of inlet apertures 16 distributed along the length of side wall 10, as well as a plurality of exhaust apertures in the opposite side wall, as will be further explained in connection with the description of FIG. 2. Each inlet aperture 16 has associated therewith a closure means in the form of a baffle 18 or the like, each of the baffles 18 being hinged at its bottom edge to the side wall 10. The position of each baffle 18 relative to the inlet aperture 16 associated therewith is controlled by an electrically driven winch 20 having a plurality of flexible lines 22 leading from the winch 20 to the respective baffles 18 and to suitable weights 24 which keep the lines taut and urge the hinged baffles 18 toward the closed position; suitable pulleys are provided for proper guidance of the lines 22 between the respective parts.

Referring now to FIG. 2, the aforementioned opposite wall is indicated at 26, and a plurality of fans or banks of fans 28, 30, 32, and 34 are positioned in respective exhaust openings in the wall 26. A second end wall 36 is provided, and the four walls, the roof and the floor constitute, as previously stated, a substantially closed enclosure except for the inlet aperture 16 and the exhaust apertures in which are positioned the fans 28, 30, 32 and 34. Thus, the ventilation of the enclosure is dependent upon the operation of the various fans to exhaust the air from the enclosure, as well as being dependent upon the effective size of the inlet apertures 16 as determined by the pivotal position of the respective baffles or louver plates 18, as will be described.

In the preferred embodiment shown in the drawings, fan 28, which may, for example, be only 24 inches in diameter, is operated under the control of a timer 38, which causes fan 28 to operate for one minute out of every five, for example. The two fans 30, which may conveniently be of the same size as fan 28, are connected to and controlled by a thermostat 40 which, in the preferred embodiment, is set to operate the fans 30 for temperatures in excess of 72° C. Similarly, the two fans 32, also preferably of the 24 inch size, are connected to and controlled by a thermostat 42, which is set at a slightly higher temperature than thermostat 40, serving to operate fans 32 for temperatures in excess of 75° F. The six fans 34 will conveniently be larger than the previously described fans and may be three or four feet in diameter. As shown in FIG. 2, the fans 34 are all connected to and controlled by a thermostat 44 which is conditioned to operate the six fans 34 for maximum exhaust ventilation at temperatures in excess of 78° F. Thus, for temperatures between 72° F. and 75° F., only fans 30 will operating, in addition to the periodic operation of fan 28. For temperatures between 75° and 78° F., fans 30 and 32 will all be operating, in addition to the periodic operation of fan 28. For temperatures in excess of 78° F., all of the fans operate simultaneously, along with periodic fan 28.

The animal enclosure of the preferred embodiment shown in the drawings is of the forced-ventilation differential-pressure type. That is to say, the ventilation of the enclosure is not achieved by merely providing openings in the walls to permit escape of heat and circulation of any air that may be moving in the vicinity. Rather, air is forcibly exhausted from the enclosure by means of the several fans, and ventilating air is, as a result, drawn in through the inlet apertures 16. It has been discovered in the past that an improved pattern of air flow and a correspondingly more nearly uniform temperature condition is achieved if the admission of ventilating air into the enclosure is held to a slightly lower rate of flow than the air within the enclosure is being exhausted, resulting in a slight negative pressure or partial vacuum within the enclosure. That is to say, it is desirable to maintain a differential in pressure across the walls of the enclosure, and a pressure difference of 0.10 inches (water column) is an acceptable figure for some installations, the particular figure obviously varying from one enclosure to another. In order to maintain this desired difference in pressure between that within the enclosure and that outside the enclosure, means are provided for comparing the two pressures and controlling the positioning of the inlet aperture baffles 18 relative to the number of fans operating at a given time so as to create the desired differential in pressure, as will now be described.

The pressure within the enclosure shown in FIG. 2 is compared to the pressure outside that enclosure by means of apparatus indicated generally at 46 and including a Photohelic pressure switch and gauge, manufactured by Dwyer Instruments, Inc., Michigan City, Indiana, and described in U.S. Pat. No. 3,862,416. This pressure switch, the face of which is indicated at 50 in FIG. 2, includes a membrane which is sensitive to the differential pressure to modify the light being received by a photocell to, in turn, give an appropriate output signal. The desired differential pressure is selected as a small range of pressures between two set points, rather than at a single fixed pressure differential, to provide stable operation of the apparatus in the immediate vicinity of the selected operating pressure differential. As will be further explained in connection with the description of FIG. 3, a differential pressure in excess of the set point pressures will close one set of contacts, whereas a differential pressure less than that of the set points will cause the closing of a different set of contacts, with neither of these contacts being closed at the desired differential pressure represented by the small range of pressures between the two set points.

In the installation illustrated in FIG. 2, the pressure outside the enclosure is applied to the apparatus 46 by means of a pipe 52 or the like which extends from the pressure sensing means through the wall of the enclosure to the outside environment. In order to prevent erratic operation as a result of wind gusts and the like, a suitable shield 54 is placed over the end of pipe 52. Power for normal operation of all of the electrical apparatus shown in this preferred embodiment is taken from an ordinary 115 volt alternating current source by means of power line 56. Depending upon the magnitude and sense of the differential pressure sensed by the apparatus 46, one or another electrical signal is applied to drive motor 58 to, through suitable gearing 60, drive the winch 20 to take up or let out the lines 22 to close or open the apertures 16 by means of the baffles 18. In order to define the limits of travel of the baffles 18, electrical switches 62 and 64 are placed in the path of a moving stud 66 which is restrained from rotation but permitted to travel along a threaded shaft 68 as the winch 20 is operated. As will be further explained in connection with the description of FIG. 3, as the stud 66 engages the operating means of either switch 62 or switch 64, the energizing circuit for motor 58 is interrupted to stop the travel of the baffles 18 at the point. As will also be further explained in connection with FIG. 3, a local direct current source in the form of battery 70 is provided, this being a source of emergency power upon the failure of the normal 115 volt alternating current source which, when applied through an inverting means in apparatus 46, serves to energize motor 58 in the direction of opening of baffles 18, this fail-safe operation continuing until stud 66 operates switch 64 to terminate the action with the baffles in the full open position.

In spite of the normal use of a pressure differential of 0.10 inches (water column) in installations of this type, it has been discovered that in conditions of extreme heat, with all of the fans in operation and, as a result, a large volume of air moving through the enclosure, it is advantageous to reduce the ordinary pressure differential to, for example, 0.05 inches (water column). To do this manually would destroy the otherwise automatic and self-contained nature of the apparatus of the preferred embodiment, but to include a second pressure differential sensing means would be to add needlessly to the cost of the installation. In accordance with the present invention, automatic conversion of the operation to create a pressure differential of only 0.05 inches (water column) when all the fans are running is achieved by means of a connection between the highest-temperature thermostat 44 and the controlling apparatus, this connection being represented by line 72 in FIG. 2, the details of the electrical circuit being explained in connection with the description of FIG. 3. However, by virtue of the connection 72, the differential pressure sensing means in apparatus 46 is disabled upon the actuation of highest-temperature thermostat 44, and the motor 58 is automatically operated to open the baffles 18 to the full open position, a position which is determined empirically, and by proper adjustment of the full-open switch 64, so that with all fans operating the full-open position of the baffles 18 results in a pressure differential between the inside and the outside of the building of 0.05 inches (water column). Thus, with but one pressure-sensing means, the circuitry and apparatus of the present invention provides automatic, unattended switching back and forth between 0.10 inches and 0.05 inches of differential pressure.

The electrical circuitry of the preferred embodiment of the invention is shown in FIG. 3, along with some of the related mechanical elements previously described. Alternating current power line 56 is connected across the coil 74 of power-failure relay 76, as well as two of the upper relay contacts 78 and 80, thus normally connecting one side of the power line 56 directly to one terminal 82 of motor 58, with the other side of power line 56 being connected to the common line 84 of motor reversing relay 86, the jumper line 88 of which is connected to motor terminal 90 and, in addition, through capacitor 92 to the inner, central contacts of the motor-reversing relay 86. As shown in the drawing, the inner, left-hand contacts of motor-reversing relay 86 are also connected, by line 94, to motor terminal 82 and the first-mentioned side of power line 56.

One winding 96 of motor 58 is connected between motor terminals 82 and 90, whereas the second winding 98 of motor 58 extends between motor terminals 100 and 102, these latter terminals being connected to the outer, left-hand contacts of relay 86 and, by means of reversing jumper cables 104 and 106, to the outer central contacts of relay 86.

Alternating current power line 56 is also permanently connected to a suitable trickle-charge battery charger 108, which provides a direct current, 12 volt output which is, in turn, connected to the terminals of battery 70. By means of this circuit, the battery 70 is kept in a state of constant charge, for use upon failure of the alternating current source to which line 56 is connected.

Fail-safe relay 76 is shown in its energized or operated condition in FIG. 3, with the four upper contacts closed and the four lower contacts open. Upon failure of the alternating current power source connected to line 56, coil 74 of fail-safe relay 76 is no longer energized, and the relay contacts reverse from the position shown in FIG. 3. Thus, the four upper contacts of relay 76 open upon failure of the primary power source, and the four lower contacts close. In particular, closing of the contacts 108 completes a circuit from the terminals of battery 70 to the input of d.c.-to-a.c. inverter 110, the alternating current output of which is supplied to filter 112 to provide, in turn, as an output an alternating current on the pair 114 to apply the emergency alternating current power to motor terminal 82 and reversing relay common line 84 through, respectively, fail-safe relay 76 contacts 116 and 118, taking the place of the alternating current power which is normally supplied by line 56.

Pipe or tubing 120 applies the barometric pressure of the interior of the animal enclosure to one side of the pressure-sensitive diaphram 122 of the previously described differential-pressure sensing means 50, the pressure of the environment surrounding the animal enclosure being conducted to membrane 122 by means of tubing or pipe 52. With the pressure differential at the selected level (within the narrow range determined by the two set points of the Photohelic switch), neither the "open" contacts 124 nor the "close" contacts 126 are closed. Further, if the temperature within the animal enclosure is less than 78° F., there is no electrical signal on line 72, and the coil 128 of temperature-controlled relay 130 is not energized, the contacts being in the state shown in the circuit diagram of FIG. 3.

"Open" coil 132 of motor-reversing relay 86 is connected by means of a delay relay 134 to the full open limit switch 64 and one of the upper contacts of temperature-controlled relay 130, as shown. Correspondingly, "close" coil 136 of motor-reversing relay 86 is connected through a delay relay 138 to closed position limit switch 62 and to another one of the upper contacts of temperature-controlled relay 130.

Turning now to the operation of the apparatus and circuitry of the disclosed preferred embodiment, and referring primarily to the circuit diagram of FIG. 3, alternating current is normally present on line 56, thus normally energizing coil 74 of fail-safe relay 76, this relay being shown in its operated or energized condition in FIG. 3, with the four upper contacts closed and the four lower contacts open. As was previously stated, one side of line 56 is thus connected through closed contacts 78 to motor terminal 82, while the other side of line 56 is connected to common line 84 of the motor-reversing relay 86, this common line 84 being connected to both coils 132 and 136 as well as to the central, right-hand contacts of the relay 86. Alternating current power is also normally applied to trickle charger 108 which, in turn, keeps battery 70 charged to a full 12 volts, direct current.

Assuming the temperature within the animal enclosure to be less than 78° F., one or more of the fans shown in FIG. 2 (excluding fans 34) will be energized, and air will be exhausted from the animal enclosure at a rate determined by the number of fans operating at a given time. If that rate of exhaust flow is sufficiently great to create within the enclosure a greater partial vacuum than desired, for the position in which the inlet baffles are then set, the pressure-differential sensing means 50 will cause its "open" contacts 124 to close, completing a circuit through contacts 140 and 142 which connects the alternating current line 56 across "open" coil 132 of motor reversing relay 86, this energizing circuit also including full-open limit switch 64 and delay relay 134, the delay relays being utilized to enhance stability of the operation of the circuit so as to ignore temporary false signals such as might be produced by a gust of wind or the like.

Energization of "open" coil 132 of motor-reversing relay 86 causes the three upper contacts of the relay to close, energizing the two windings 96 and 98 of motor 58 to drive the latter in the direction to move the several baffles 18 away from the inlet apertures 16 to increase the rate of ingress of ventilating air. The circuitry for energizing the two motor windings in this direction may be traced as follows: The left-hand line of power line 56 is connected through closed relay contacts 78 to the motor terminal 82 and the right-hand end of motor winding 96, while the right-hand line of power line 56 is connected through closed contacts 80, line 84, the closed upper contact of relay 86, line 88 and motor terminal 90 to the left-hand end of motor winding 96; the left-hand line of power line 56 is also connected through line 94 and the associated closed upper contact of relay 86 to the motor terminal 100 and the top of motor winding 98, while the right-hand line of power line 56 is connected through closed contact 80, line 84, the closed upper contact associated therewith, capacitor 92 (to create the proper phase relationship in the energization of motor windings 96 and 98), closed upper central contact of relay 86 and motor terminal 102 to the lower end of motor winding 98. This energization of motor 58 continues until the pressure-differential sensing means 50 is satisfied, at which point contacts 124 once again open and terminate the motor energization.

If, on the other hand, the number of exhaust fans operating at a given time is insufficient relative to the effective size of the inlet apertures to create the desired partial vacuum within the animal housing, the pressure-differential sensing means 50 causes the "close" contacts 126 to close, closing a circuit through closed contacts 144, closed-position limit switch 62, delay relay 138 and "close" coil 136 of motor-reversing relay 86, thus energizing the motor in a reverse direction to move the inlet baffles 18 toward their respective inlet apertures 16 to reduce the rate of flow of incoming air. The circuitry for energizing the motor 58 for operation in this direction is similar to that described for the aperture-opening direction, except for the reversal effected by means of the two jumper lines 104 and 106 by means of which the phase of the alternating current applied to the motor 58 through capacitor 92 is reversed.

Some suitable mechanical brake means 146 is adapted to grip the operating shaft 68 of motor 58 when the motor is not energized; energization of motor winding 96 causes simultaneous energization of brake winding 148 to release the grip of brake 146 and permit rotation of the motor shaft.

When the temperature within the animal enclosure is in excess of 78° F., all of the banks of exhaust fans are in operation, as a result of the fact that all three thermostats 40, 42 and 44 are actuated. Though the thermostat-fan circuits indicated in FIG. 2 do not directly show a power source for energizing the motors which drive the several fans, it will be understood that the alternating current line 56 supplies power for the actual running of the fans, whereas the three thermostats 40, 42, and 44 control the application of that power fan to the fan motors to increase the number of fans operating as the temperature rises within the enclosure. Once the temperature in the enclosure exceeds 78° F., the thermostat 44 also provides an electrical signal by means of line 72 to operating coil 128 of temperature-controlled relay 130 in FIG. 3. Upon energization of coil 128 and operation of relay 130, the three upper sets of contacts are open and the three lower contacts are closed, in effect disabling the differential-pressure sensing means 50 with respect to its normal control of the operation of the motor-reversing relay 86. More specifically, when the coil 128 of temperature-controlled relay 130 is energized, the three output or control lines from the differential-pressure sensing means 50 (connected across contacts 124 and 126) are disconnected from the rest of the circuit, irrespective of the differential pressure sensed by the means 50. Control of the motor 58 is thus taken away from the differential-pressure sensing means, and the alternating current input line 56 is placed across the "open" coil 132 of the motor-reversing relay 86 by way of closed contacts 78, lines 150 and 152, closed contacts 154 of temperature-controlled relay 130, full-open limit switch 64 and delay relay 134. Motor 58 is thus driven in the direction to open the inlet apertures to the full-open position as determined by limit switch 64, which, as previously explained, is positioned relative to operating shaft 68 and stud 66 thereon to interrupt the motor drive at a point at which the inlet baffles 18 are open sufficiently (for the condition of all fans in operation) to establish the second desired differential pressure of 0.05 inches (water column) for as long as the temperature within the enclosure exceeds 78° F.

Should the alternating current source connected to line 56 fail, coil 74 of fail-safe relay 76 is no longer energized, and the relay is actuated to open all four of the upper sets of contacts, while closing the lower four sets of contacts. The closing of contacts 108 places the battery across the input to the inverter 110, the output of which is filtered in filter 112 and applied to the motor circuitry by means of closed contacts 116 and 118, in effect replacing the remote alternating current source connected to line 56. Closure of contacts 108 of relay 76 also connects battery 70 across brake coil 156, to ensure release of brake 146 to permit actuation of motor 58 and movement of the inlet baffles 18 to the full-open position. Such fail-safe movement to the full-open position is effected by means of a circuit leading from closed contacts 116 in relay 76, through line 150, closed contacts 158 of the same relay, and then full-open limit switch 64 and delay relay 134, leading to the "open" coil 132 of motor-reversing relay 86; the other side of coil 132 is connected to the other side of the auxiliary power source by means of closed contacts 118 in relay 76. Upon the reappearance of a remote alternating current source on line 56, coil 74 of fail-safe relay 76 is energized once again, and the four lower contacts of relay 76 open, while the four upper contacts close, re-establishing the original circuits and thus providing an automatic, unattended return from the fail-safe condition.

The invention has been described above in considerable detail, and the particular parameters of the preferred embodiment, such as the two differential pressures of 0.10 and 0.05 inches (water column), pertain particularly to the growing of chickens. However, it will obvious to those skilled in the art that the apparatus of the present invention is readily applicable to the growing of fowl other than chickens, and, indeed, to the growing of any livestock requiring a carefully controlled environment in order to produce an efficient and economical conversion of grain or other feed into salable meat. In addition, even in the growing of chickens it will be obvious that the specific pressure difference found best for one enclosure may not provide optimum operating conditions in another. Different types of enclosures each present their own set of parameters, and even different enclosures of the same type will, in practice, have individual characteristics which will dictate a normal pressure difference other than 0.10 inches (water column), as set forth in the description of the preferred embodiment. Animal enclosures of the pressure-differential type must necessarily be substantially air-tight and well insulated, and the degree to which a given enclosure is insulated or to which it approaches a sealed, air-tight house (except for the inlet and exhaust apertures) determines the pressure differential that is optimum for that particular house. In some instances, the differential-pressure sensing means may be set to maintain a difference of only 0.08 inches (water column) or of, say, even as high as 1.25 inches (water column). It will be appreciated that a properly insulated enclosure operating at (for that enclosure) an optimum pressure differential will effect a considerable savings in the cost of heating in cold weather, since automatic control of this type results in the movement of less air through the enclosure, and, accordingly, the loss of less heat, while still providing proper ventilation.

The movable baffles or closures 18 have been shown hinged at their bottom edges in the description of the preferred embodiment. However, it will be obvious that the closures of the present invention may equally well be hinged at the top or pivoted midway between the top and the bottom; further, the closures could take the form of sliding doors or the like. Irrespective of the particular form of the closure employed, it is advantageous in cold weather to cause the incoming air to be deflected upwardly toward the ceiling to mix with the warmer air there before circulation through the enclosure, while in hot weather, when the fans are utilized both for ventilation and the movement of air within the house, it is helpful to deflect the incoming air downwardly so that the enclosed animals have the benefit of fresh moving air in their immediate vicinity.

Finally, it will be understood that the particular temperatures to which the thermostats 40, 42 and 44 are set for operation as described in the preferred embodiment are merely illustrative of one example: in practice, the temperatures at which these three thermostats operate may be chosen at will, depending upon the needs of a particular installation.

Hence, the invention is not to be considered as being limited to the particular details given, nor to the specific application to which reference has been made during the description of the preferred embodiment of the apparatus, except insofar as may be reqired by the scope of the appended claims.

What is claimed is:

1. In an animal enclosure of the differential-pressure forced-ventilation type the walls of which are substantially closed except for a plurality of inlet apertures therein for the ingress of ventilating air and a plurality of exhaust apertures therein for the egress of ventilating air, such enclosure having an electrically driven exhaust fan at each such exhaust aperture, a plurality of electrical thermostats set to operate at respective selectable temperatures within a range of temperatures through which such enclosure is expected to operate and each controlling at least one such exhaust fan, and closure means for each such inlet aperture variably positionable with respect thereto so as to control the effective size thereof, a ventilation control system comprising:
    means for comparing the barometric pressure within such enclosure with that outside such enclosure,
    electromechanical drive means responsive to the output of said pressure-comparing means and mechanically connected to such closure means to move the latter in the aperture-opening direction in response to a sensed pressure differential in excess of a preselected amplitude and to move such closure means in the aperture-closing direction in response to a sensed pressure differential less than a preselected amplitude, and
    means responsive to the actuation of that one of such thermostats which is set to be operated at the highest selected temperature in such operating temperature range to operate said electromechanical drive means in the aperture-opening direction irrespective to the nature of the output of said pressure-comparing means.

2. An animal enclosure ventilation control system in accordance with claim 1, and including means for de-energizing said electromechanical drive means from the aperture-opening condition upon the movement of such closure means to the position of a predetermined maximum-area aperture.

3. An animal enclosure ventilating control system in accordance with claim 2, wherein said de-energizing means is set to operate upon the attainment of a predetermined maximum aperture which in cooperation with the number of such exhaust fans operating when such highest-temperature thermostat is actuated establishes a predetermined differential in amplitude between the barometric pressures within and without such enclosure substantially less than either of said preselected amplitudes 4. An animal enclosure ventilation control system in accordance with claim 1, and including means for de-energizing said electromechanical drive means from the aperture-closing condition upon the movement of such closure means to a position substantially closing such apertures.

5. An animal enclosure ventilation control system in accordance with claim 1, and including electromechanical brake means which in the de-energized condition mechanically grip and hold stationary said mechanical connection between said drive means and such closure means, and means for electrically energizing said brake means simultaneously with said drive means to release said brake means during operation of said drive means.

6. An animal enclosure ventilation control system in accordance with claim 1, wherein electrical power for operating said electromechanical drive means is normally supplied by a remote alternating current source, and including means connected to such remote source for converting alternating current from such remote source to direct current for charging a local direct current source, means for inverting the output of such a local direct current source to provide an alternating current output substantially similar to that of such remote alternating current source, and safety means responsive to both the presence of alternating current from such remote source to connect such electromechanical drive means and the absence of alternating current from such remote source to connect such local direct current source to the input of said inverting means and to connect the output of said inverting means to said electromechanical drive means to energize the latter in the aperture-opening direction, said safety means further being responsive to the renewed presence of alternating current from such remote source to disconnect said current inverting means from both said electromechanical drive means and such local direct current source and to connect such remote alternating current source to said electromechanical drive means.

7. A ventilation control system for an animal enclosure of the differential-pressure forced-ventilation type comprising:

a plurality of enclosure walls substantially closed except for a plurality of inlet apertures therein for the ingress of ventilating air and a plurality of exhaust apertures therein for the egress of ventilating air, an electrically driven exhaust fan at each said exhaust aperture, a plurality of electrical thermostats set to operate at respective selectable temperatures within a range of temperatures through which said enclosure is expected to operate and each controlling at least one said exhaust fan.

closure means for each said inlet aperture variably positionable with respect thereto so as to control the effective size thereof, means for comparing the barometric pressure within said enclosure with that outside said enclosure, electromechanical drive means responsive to the output of said pressure-comparing means and mechanically connected to said closure means to move the latter in the aperture-opening direction in response to a sensed pressure differential in excess of a preselected amplitude and to move such closure means in the aperture-closing direction in response to a sensed pressure differential less than a preselected amplitude, and means responsive to the actuation of that one of said thermostats which is set to be operated at the highest selected temperature in said operating temperature range to operate said electromechanical drive means in the aperture-opening direction irrespective of the nature of the output of said pressure-comparing means.

8. A ventilation control system for an animal enclosure in accordance with claim 7, and including means for de-energizing said electromechanical drive means from the aperture-opening condition upon the movement of said closure means to the position of a predetermined maximum area aperture.

9. A ventilation control system for an animal enclosure in accordance with claim 8, wherein said de-energizing means is set to operate upon the attainment of a predetermined maximum aperture which in cooperation with the number of said exhaust fans operating when said highest-temperature thermostat is actuated establishes a predetermined differential in amplitude between the barometric pressures within and without said enclosure substantially less than either of said preselected amplitudes.

10. A ventilation control system for an animal enclosure in accordance with claim 7, and including means for de-energizing said electromechanical drive means from the aperture-closing condition upon the movement of said closure means to a position substantially closing said apertures.

11. A ventilation control system for an animal enclosure in accordance with claim 7, and including electromechanical brake means which in the de-energized condition mechanically grip and hold stationary said mechanical connection between said drive means and said closure means, and means for electrically energizing said brake means simultaneously with said drive means to release said brake means during operation of said drive means.

12. A ventilation control system for an animal enclosure in accordance with claim 7, wherein electrical power for operating said electromechanical drive means is normally supplied by a remote alternating current source, and including, means connected to said remote source for converting alternating current from said remote source to direct current for charging a local direct current source, means for inverting the output of said local direct current source to provide an alternating current output substantially similar to that of said remote alternating current source, and safety means responsive to both the presence of alternating current from said remote source to connect said source of said electromechanical drive means and the absence of alternating current from said remote source to connect said local direct current source to the input of said inverting means and to connect the output of said inverting means to said electro-mechanical drive means to energize the latter in the aperture-opening direction, said safety means further being responsive to the renewed presence of alternating current from said remote source to disconnect said current inverting means from both said electromechanical drive means and said local direct current source and to connect said remote alternating current source to said electromechanical drive means.

13. In an animal enclosure of the diffential-pressure forced-ventilation type, a ventilation control system, comprising:
 means for sensing the temperature within the enclosure,
 means for exhausting air from such an enclosure at respectively different rates of flow for each of a plurality of predetermined temperatures, the rate of exhaust flow being greater for each successively higher temperature,
 means for admitting air into such enclosure at a rate of flow selectable over a range from a minimum to a maximum flow,
 means for controlling said admitting means to maintain a first predetermined difference between the barometric pressure within such enclosure and that outside such enclosure, and
 means for disabling said controlling means at the highest of said predetermined temperatures and for setting said admitting means for maximum flow, thereby establishing a second predetermined difference between the barometric pressure within such enclosure and that outside such enclosure.

14. An animal enclosure ventilation control system in accordance with claim 13, wherein said exhausting and temperature sensing means includes a thermostat and at least one exhaust fan controlled thereby for each of said plurality of predetermined temperatures, whereby the number of exhaust fans running at a given time is determined by the temperature within such enclosure.

15. An animal enclosure ventilation control system in accordance with claim 13, wherein said admitting means includes one or more inlet apertures of an effective size variable between limits corresponding to said minimum and said maximum flow.

16. An animal enclosure ventilation control system in accordance with claim 13, wherein said controlling means includes pressure-differential sensing means providing a first output signal when the difference between the barometric pressure within and without such enclosure is greater than a first predetermined amplitude and providing a second output signal when such difference is less than such first predetermined amplitude, and driving means responsive to said first and second output signals for adjusting said admitting means to respectively increase and decrease the rate of flow of air through said admitting means.

17. An animal enclosure ventilation control system in accordance with claim 13, wherein said disabling means includes an electrical relay which is energized at the highest of said predetermined temperatures to disconnect the output of said controlling means from said admitting means and to connect a power source to said admitting means to adjust said admitting means for said maximum flow.

18. The method of automatically maintaining the barometric pressure within an animal enclosure at either of two predetermined amplitudes relative to that outside such enclosure, comprising the steps of
 exhausting air from such enclosure at respectively different rates of flow for each of a plurality of predetermined temperatures, the rate of exhaust flow being greater for each successively higher temperature,
 admitting air into such enclosure at a rate of flow selectable over a range from a minimum to a maximum flow,
 normally controlling said admission of air to maintain a first predetermined difference between the barometric pressure within such enclosure and that outside such enclosure, and
 ceasing such normal differential-pressure control at the highest of of said predetrmined temperatures and admitting air at the rate of said maximum flow, thereby establishing a second predetermined difference between the barometric pressure within such enclosure and that outside such enclosure.

* * * * *